(12) United States Patent
Gwon et al.

(10) Patent No.: US 10,352,785 B2
(45) Date of Patent: Jul. 16, 2019

(54) METHOD MEASURING AXIAL FORCE OF BOLT

(71) Applicants: Hyundai Motor Company, Seoul (KR); Kia Motors Corporation, Seoul (KR); IUCF-HYU (Industry-University Cooperation Foundation Hanyang University), Seoul (KR)

(72) Inventors: Jae-Soo Gwon, Yongin-si (KR); Gyung-Min Toh, Seoul (KR); Jae-Hong Lee, Busan (KR); Jun-Hong Park, Seongnam-si (KR)

(73) Assignees: Hyundai Motor Company, Seoul (KR); Kia Motors Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 0 days.

(21) Appl. No.: 15/870,299

(22) Filed: Jan. 12, 2018

(65) Prior Publication Data

US 2018/0328797 A1 Nov. 15, 2018

(30) Foreign Application Priority Data

May 15, 2017 (KR) .................. 10-2017-0059991

(51) Int. Cl.
*G01L 1/10* (2006.01)
*B25B 23/14* (2006.01)
*G01L 5/00* (2006.01)
*G01L 5/24* (2006.01)

(52) U.S. Cl.
CPC ............... *G01L 1/10* (2013.01); *B25B 23/14* (2013.01); *G01L 5/0042* (2013.01); *G01L 5/24* (2013.01)

(58) Field of Classification Search
CPC ..................................... G01L 1/10; G01L 5/24
See application file for complete search history.

(56) References Cited

U.S. PATENT DOCUMENTS

| 3,975,948 A * | 8/1976 | Makino | ................... G01L 5/246 73/581 |
| 2015/0316435 A1 * | 11/2015 | Persson | ................... G01L 5/246 73/862.59 |
| 2016/0131178 A1 * | 5/2016 | Shiba | ................... H05K 7/1418 411/368 |

FOREIGN PATENT DOCUMENTS

KR 10-2015-0095643 A 8/2015

* cited by examiner

*Primary Examiner* — Jamel E Williams
(74) *Attorney, Agent, or Firm* — Morgan, Lewis & Bockius LLP

(57) ABSTRACT

A method of measuring an axial force of a bolt may include fastening a joint using a fastener, receiving a vibration signal by a detector, transforming the received vibration signal into frequency domain data having a plurality of frames, analyzing the signal transformed into the frequency domain data, and predicting an axial force and indicating a predictive value thereof.

16 Claims, 10 Drawing Sheets

METHOD MEASURING AXIAL FORCE OF BOLT

CROSS-REFERENCE(S) TO RELATED APPLICATIONS

The present application claims priority to Korean Patent Application No. 10-2017-0059991, filed on May 15, 2017, the entire contents of which is incorporated herein for all purposes by this reference.

BACKGROUND OF THE INVENTION

Field of the Invention

The present invention relates to a method for measuring an axial force of a bolt; and, more particularly, the present invention relates to a method configured for measuring an axial force of a bolt using vibration characteristics occurring when fastening a joint using a fastener.

Description of Related Art

In various industrial fields, including machinery, plant, and power plant turbines, a stable fastening force of bolts has been required as advanced machinery and structures become larger.

Furthermore, an internal combustion engine is one of the more critical component that outputs kinetic energy in a vehicle, and is therefore necessary to manage a fastening force of the engine in the production of the engine.

Although poor fastening of the engine has various causes, the poor fastening is representatively accompanied with vibration and noise when the engine is driven. In the related art, a skilled worker drives a completed engine and detects vibration or noise occurring in the driven engine by feel or ear to detect the poor fastening of the engine. However, the present method has a limit in estimating the fastening force of a fastener and thus the poor assembly of the engine.

A method of measuring a fastening force (axial force) of a bolt using ultrasonic waves is used as an alternative to the method using such a human detection. The method of measuring a fastening force (axial force) of a bolt using ultrasonic waves is a method of measuring a change (deformation) in length of the bolt by its axial force using a time-of-flight of an ultrasonic wave to determine an axial force from elastic properties of a material.

The method of measuring an axial force of a bolt using ultrasonic waves is advantageous in that the method can standardize axial force measurement, compared to a mechanical method in which measurement taking is inconvenience, costly, and time consuming.

However, the method of measuring an axial force of a bolt using ultrasonic waves is disadvantageous in that, since the head or end portion of the bolt has a non-planar surface, echo signals are erroneous or the length of the bolt should be accurately measured before the bolt is fastened. Hence, the provided method is not properly utilized in the field.

Accordingly, there exists a demand for a method of measuring an axial force of a bolt, which is configured for increasing utilization in the actual field and of increasing accuracy/precision of the axial force measurement.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for measuring an axial force of a bolt, which is configured for increasing measurement accuracy by directly measuring the axial force of the bolt using vibration or sound, as dynamic characteristics, occurring when fastening the bolt, from among methods for measuring axial forces of bolts.

Other various aspects of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, a method for measuring an axial force of a bolt may include fastening a joint using a fastener, receiving a vibration signal by a detector, transforming the received vibration signal into frequency domain data having a plurality of frames, analyzing the signal transformed into the frequency domain data, and predicting an axial force and indicating a predictive value thereof.

In the transforming the received vibration signal into frequency domain data, the received vibration signal may undergo fast Fourier transform while having a predetermined overlap ratio with respect to a predetermined time.

The predetermined time may be 100 ms, and the predetermined overlap ratio may be 50% to 90%.

The analyzing the signal transformed into the frequency domain data may include deriving a cepstrum coefficient, determining a reference value, and determining a Euclidean distance.

The deriving the cepstrum coefficient may include applying a high-pass filter to a frequency domain data pair to include only a high-frequency band therein, determining a magnitude value in a high-frequency section as a representative value for each frame, and deriving the cepstrum coefficient by the data pair with a plurality of coefficients.

In the determining a magnitude value in a high-frequency section as a representative value, the representative value may be determined by dividing a configured frequency bandwidth by multiples of harmonic components.

In the determining a reference value, the cepstrum coefficient, which is determined for a signal having the largest fastening force value of the axial force among predetermined vibration signals, may be determined as the reference value.

In the determining a Euclidean distance, a Euclidean distance between a centroid of a reference value data and a centroid of each fastening force data sample may be determined.

In the predicting an axial force and indicating a predictive value thereof, Euclidean distance values determined for each fastening force may be fitted into a linear or quadratic polynomial function to determine the axial force by a differentiable equation, and the Euclidean distance of the measured vibration signal may be substituted into the equation to predict the axial force.

In accordance with various exemplary embodiments of the present invention, a method for measuring an axial force of a bolt may include fastening a joint using a fastener, receiving a vibration signal by a detector, determining a torque at a specific time by synthesizing vibration signals generated during fastening, and predicting an axial force and indicating a predictive value thereof by transforming the received vibration signal into frequency domain data having a plurality of frames, deriving a revolutions per minute (RPM) and a fastening time, and determining them with the determined torque.

The determining a torque may include selectively synthesizing modes according to bolt characteristics through empirical mode decomposition of the received signal, and determining the torque by deriving a cepstrum coefficient, determining a reference value, and then determining a Euclidean distance.

The predicting an axial force and indicating a predictive value thereof may include transforming the received vibration signal into the frequency domain data, deriving the RPM to form a k value determined according to the torque and the RPM, and deriving the fastening time to predict and indicate the axial force using the k value and the fastening time.

The RPM may be specified by modulation derived from the vibration signal using frequency transform.

The fastening time may be a difference between a time ($t_1$) at which a predetermined torque is derived and a time ($t_2$) at which the largest signal is generated.

In accordance with a further exemplary embodiment of the present invention, a method for measuring an axial force of a bolt may include fastening a joint using a fastener, receiving a vibration signal by a detector, deriving a cepstrum coefficient, transforming the received vibration signal into frequency domain data having a plurality of frames, determining a weight vector matrix using the cepstrum coefficient, the frequency domain data, and an artificial neural network, and predicting an axial force and indicating a predictive value thereof through a signal to be measured and the learned weight vector matrix.

The determining a weight vector matrix may include inputting the cepstrum coefficient and the frequency domain data as a supervised signal which is a vibration signal having a premeasured axial force value as an index, forming a multilayered weight vector matrix by a gradient descent method using a cost function, and learning and optimizing a plurality of input values.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
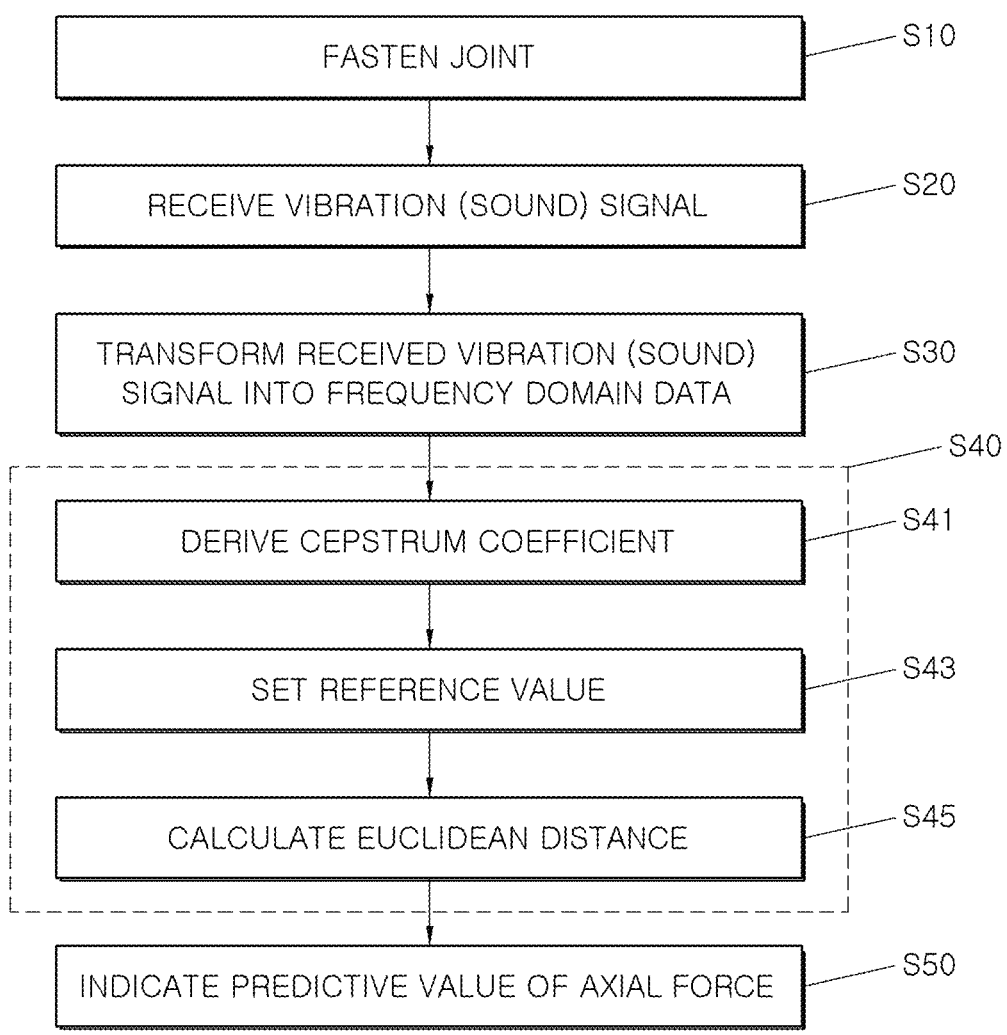
FIG. 1 is a flowchart illustrating a method for measuring an axial force of a bolt according to various exemplary embodiments of the present invention.

It should be understood that the appended drawings are not necessarily to scale, presenting a somewhat simplified representation of various features illustration of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terms and words used in the specification and claims may not be construed as their ordinary or dictionary sense. On the basis of the principle that the inventor can define the appropriate concept of a term to describe his or her own invention in the best way, it should be construed as meaning and concepts for complying with the technical idea of the present invention. Accordingly, the exemplary embodiments described in the present embodiment and the construction shown in the drawings are nothing but one exemplary embodiment of the present invention, and it does not cover all the technical ideas of the invention. Thus, it should be understood that various changes and modifications may be made at the time of filing the present application. Furthermore, the terms, including first and/or second, used in the specification of the present invention may be used to describe various elements of the present invention. However, the elements of the present invention should not be limited by the terms used in the specification of the present invention, and these terms will be used only to differentiate one element from other elements of the present invention.

Figure 2A:
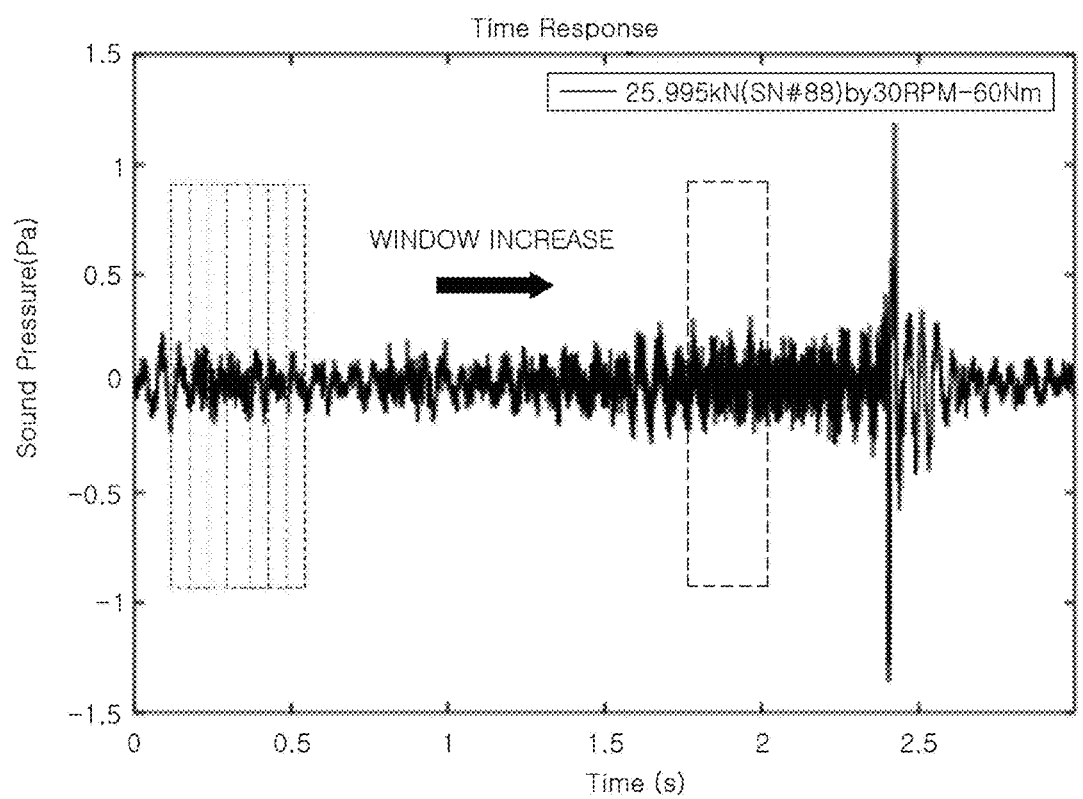
FIG. 2A and FIG. 2B are graphs illustrating a state in which fast Fourier transform is conducted according to an exemplary embodiment of the present invention.
Figure 2B:
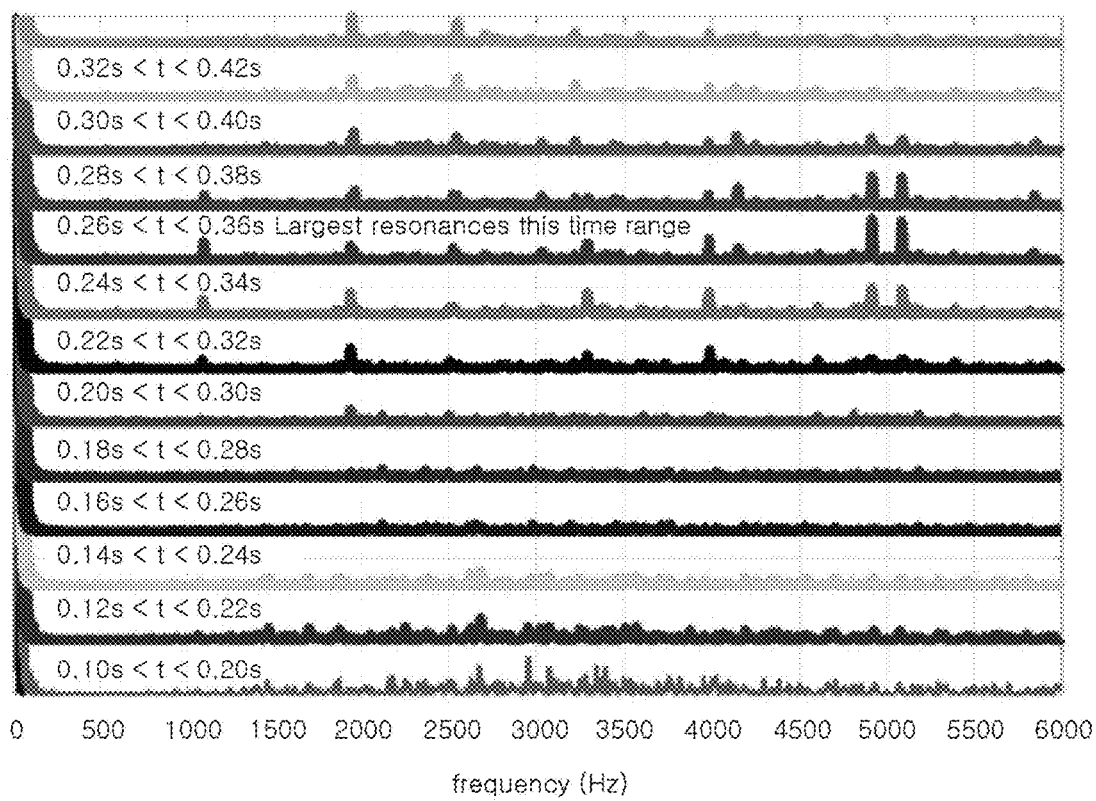
Figure 2C:
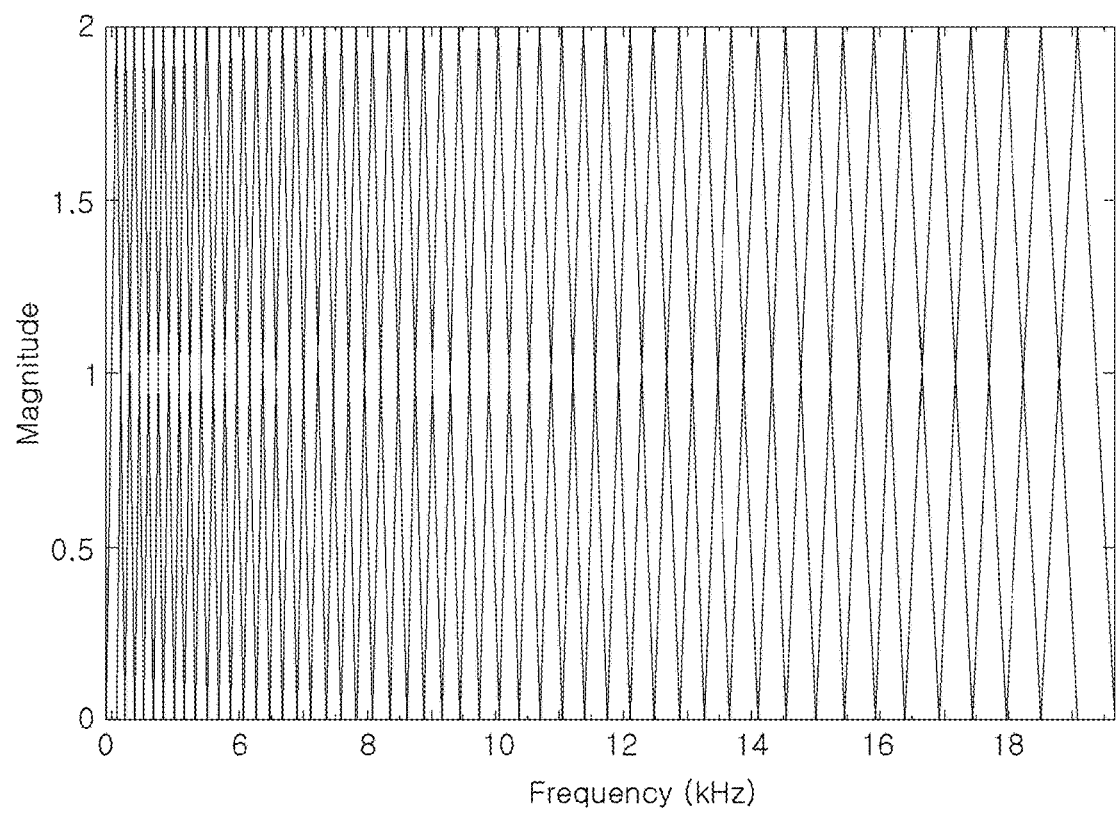
FIG. 2C is a graph illustrating triangle filters that are applied and divided according to a frequency band according to an exemplary embodiment of the present invention.

FIG. 1 is a flowchart illustrating a method for measuring an axial force of a bolt according to various exemplary embodiments of the present invention. FIG. 2A and FIG. 2B are graphs illustrating a state in which a fast Fourier transform is conducted. FIG. 2C is a graph illustrating triangle filters that are applied and divided according to a frequency band.

Referring to FIG. 1, FIG. 2A, FIG. 2B, and FIG. 2C, the method for measuring an axial force of a bolt according to the various exemplary embodiments of the present invention includes fastening a joint using a fastener (S10), receiving a vibration signal by a detector (S20), transforming the received vibration signal into frequency domain data having a plurality of frames (S30), analyzing the signal transformed into the frequency domain data (S40), and predicting an axial force and indicating a predictive value thereof (S50).

The fastening a joint using a fastener (S10) includes rotating a nut about a bolt. The fastener 20 includes a power tool or a hand tool.

When the joint 10 is fastened using the fastener 20, the bolt is excited by the fastener 20 to generate a vibration (sound) signal, and the generated vibration signal reflects the fastening force of the bolt.

In receiving a vibration signal by a detector (S20), the vibration signal reflecting the fastening force of the bolt is received by a detector 30 including a microphone.

The signal acquired by the detector 30 is processed and analyzed by a controller 40.

That is, the received vibration signal undergoes the process of transforming the received vibration signal into frequency domain data having a plurality of frames (S30), and the process of analyzing the signal transformed into the frequency domain data (S40).

In transforming the received vibration signal into frequency domain data having a plurality of frames (S30), the received vibration signal undergoes fast Fourier transform while having a predetermined overlap ratio with respect to a predetermined time.

Here, the predetermined time is 100 ms, and the predetermined overlap ratio is 50% to 90%.

Referring to FIG. 2A and FIG. 2B, the fast Fourier transform is conducted with respect to the predetermined time (100 ms).

For example, a section of 0.10 s to 0.20 s is configured as a first window and the section of 0.12 s to 0.22 s is set as a second domain. In the present state, the fast Fourier transform is conducted while the domains gradually increase and overlap to the end of the data. In FIG. 2B, since 0.80 s overlaps between 0.10 s and 0.20 s, the overlap ratio is 80%.

The step of analyzing the signal transformed into the frequency domain data (S40) includes a step of deriving a cepstrum coefficient (S41), a step of determining a reference value (S43), and a step of determining a Euclidean distance (S45).

That is, in a process of analyzing the signal transformed into the frequency domain data (S40), the cepstrum coefficient is derived using linear triangle filters, the reference value is set, and the Euclidean distance between the reference value and the fastening force data is determined.

The process of deriving a cepstrum coefficient includes applying a high-pass filter to a frequency domain data pair to include only a high-frequency band therein, a step of determining a magnitude value in a high-frequency section as a representative value for each frame, and a step of deriving the cepstrum coefficient by the data pair with a plurality of coefficients.

The high-pass filter is applied to determine a bandwidth of filter design and include only a high-frequency band to prevent being affected by work environment or noise.

Furthermore, the determining a magnitude value in a high-frequency section as a representative value is a process of obtaining a representative value by dividing the set frequency bandwidth by multiples of harmonic components (for example, 50). That is, 50 divided triangle filters are applied according to the frequency band, as illustrated in FIG. 2C.

Accordingly, one magnitude value is determined for each domain, and a log is again applied to the determined value to derive a cepstrum through discrete cosine transform (DCT). The derived cepstrum is indicated as a data pair with a plurality of coefficients.

The process of determining a reference value (S43) includes determining a cepstrum coefficient, which is determined for a signal having the largest fastening force value of an axial force among the predetermined vibration signals, as the reference value.

That is, the cepstrum coefficient, which is determined through S10 to S41 for a signal, having the largest fastening force value of the axial force acquired by a device including a load cell, among the predetermined vibration signals, is determined as the reference value.

The process of determining a Euclidean distance (S45) includes determining a Euclidean distance between a centroid of the reference value data and a centroid of each fastening force data sample.

That is, a plurality of vibration signal samples of the predetermined fastening force value is acquired by a device including a load cell, the cepstrum coefficients are derived by repeating S10 to S43 for the same, and the distribution of values is reconstituted wherein the distribution of data pairs of cepstrum coefficients having the respective pre-known fastening forces with the centroid is minimized according to the reference value data and the number of centroids determined by k-means algorithm.

Thereinafter, the Euclidean distance between the centroid of the reference value data and the centroid of each fastening force data sample is determined.

The process of predicting an axial force and indicating a predictive value thereof (S50) includes fitting Euclidean distance values determined for each fastening force into a linear or quadratic polynomial function to determine an axial force by a differentiable equation, and substituting the Euclidean distance of the measured vibration signal into the equation to predict the axial force and indicate the force on a display 50.

Figure 3A:
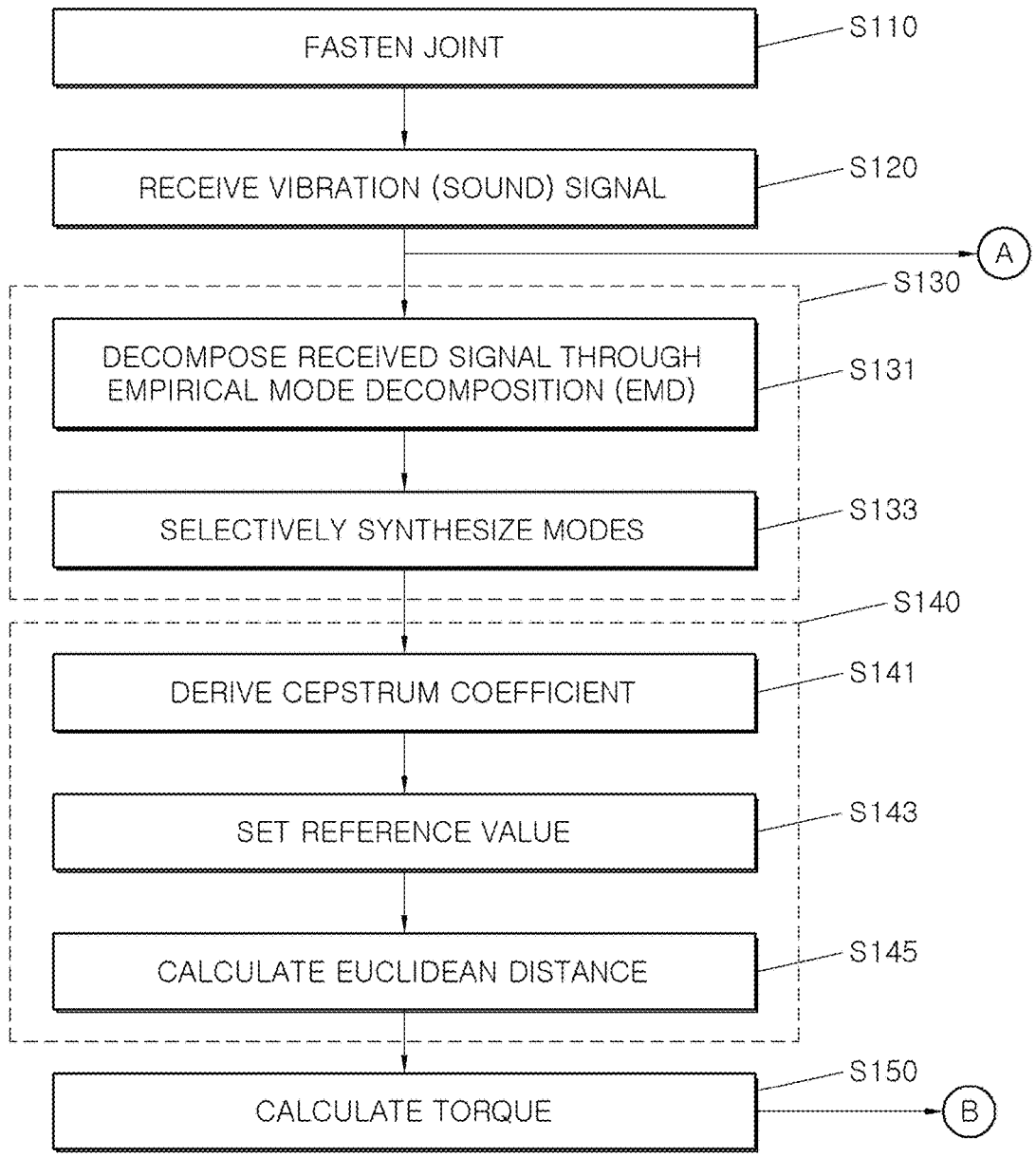
FIG. 3A and FIG. 3B are flowcharts illustrating a method for measuring an axial force of a bolt according to various exemplary embodiments of the present invention.
Figure 3B:
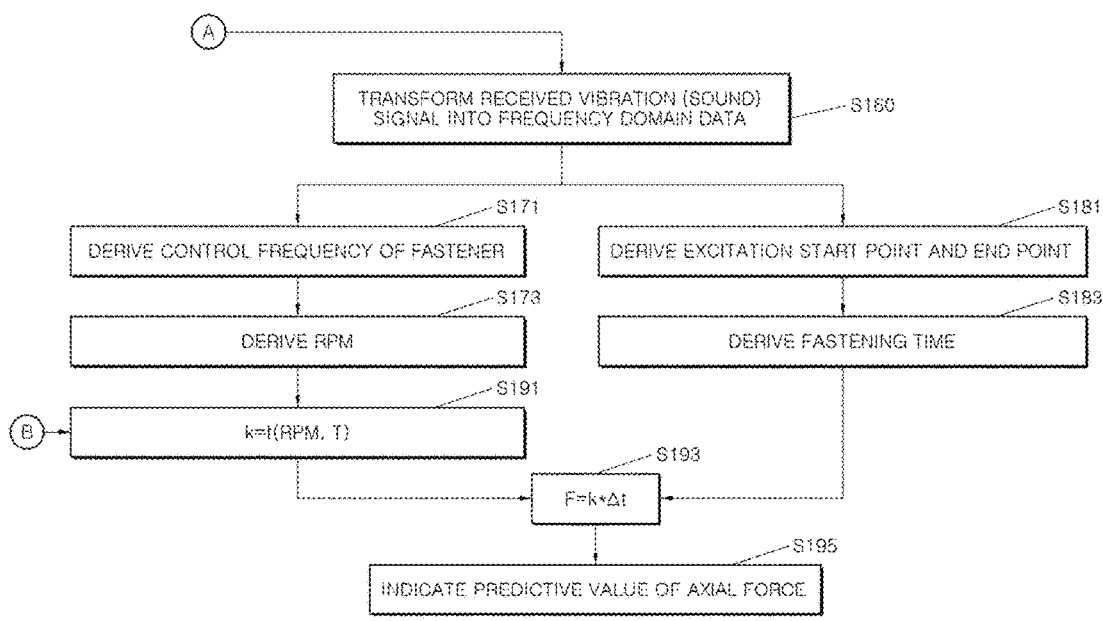
Figure 4:
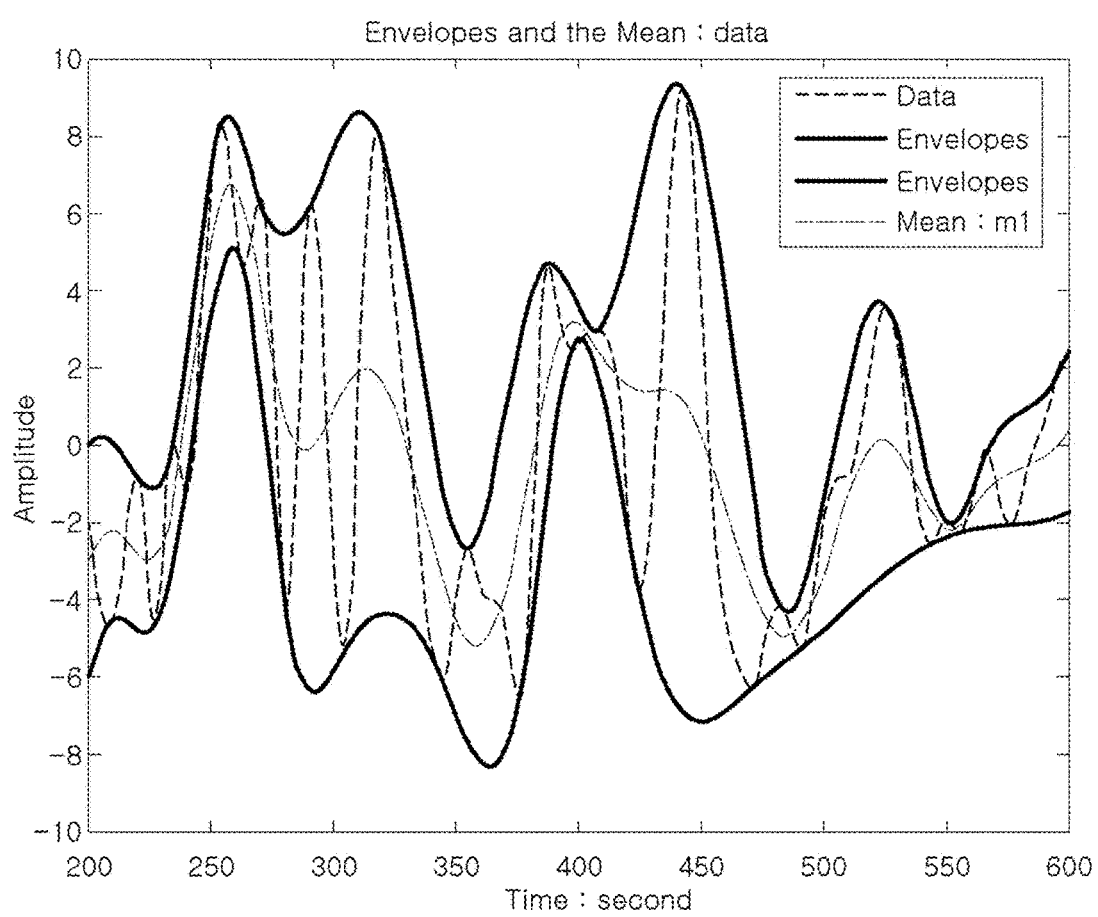
FIG. 4 is a graph illustrating empirical mode decomposition according to an exemplary embodiment of the present invention.

FIG. 3A and FIG. 3B are flowcharts illustrating a method for measuring an axial force of a bolt according to various exemplary embodiments of the present invention. FIG. 4 is a graph illustrating empirical mode decomposition.

The method for measuring an axial force of a bolt according to the various exemplary embodiments of the present invention corresponds to that according to the various exemplary embodiments of the present invention, and the method for measuring an axial force of a bolt according to the various exemplary embodiments of the present invention will be mainly described regarding points different from the various exemplary embodiments of the present invention.

Referring to FIG. 3A and FIG. 3B, the method for measuring an axial force of a bolt according to the various exemplary embodiments of the present invention includes fastening a joint using a fastener (S110), a step of receiving a vibration signal by a detector (S120), steps of synthesizing vibration signals generated during fastening to determine a torque at a predetermined time (S130 and S140), and a step of transforming the received vibration signal into frequency domain data having a plurality of frames (S160) to predict an axial force and indicate a predictive value thereof by deriving an RPM and a fastening time and determining them with the determined torque.

That is, the method for measuring an axial force of a bolt according to the various exemplary embodiments of the present invention receives vibration signals generated when the joint is fastened using a power tool with a constant rotation speed and derives a torque, an RPM, and a fastening time to determine an axial force by linearly determining them.

The process of fastening a joint using a fastener (S110) includes rotating a nut about a bolt.

In a process of receiving a vibration signal by a detector (S120), the vibration signal reflecting the fastening force of the bolt is received by the detector 30 including a microphone.

The steps of synthesizing vibration signals generated during fastening to determine a torque at a predetermined time (S130 and S140) include a step of selectively synthesizing modes according to bolt characteristics through empirical mode decomposition (EMD) of the received signal (S130), and a step of determining the torque by deriving a cepstrum coefficient, determining a reference value, and then determining a Euclidean distance (S140).

Referring to FIG. 4, the empirical mode decomposition (EMD) is a method of curve fitting all extreme values into a cubic function in a circular signal indicated by a dotted line to obtain envelopes and then obtain an alternate long and short dash line connecting median values of the envelopes.

In the present case, when the curve obtained by subtracting the alternate long and short dash line from the circular signal indicated by the dotted line satisfies a condition wherein 1) a number of maximum values and minimum values of all signals is equal to a number of crossing "0" instances or a difference therebetween is one, or 2) a mean value of maximum values and minimum values of envelopes is "0" in all signals, it is determined that intrinsic mode functions (IMFs) are derived.

However, when it does not satisfy the two conditions, the curve obtained by subtracting the alternate long and short dash line from the circular signal indicated by the dotted line is configured as a circular signal and the above process is repeated.

Each of the IMFs extracted through the EMD has vibration (noise) characteristics of bolts, friction, fasteners, fastening parts, or the like. Among them, low IMFs including an IMF1, an IMF2, and an IMF3 include high-frequency components and thus reflect the bending vibration mode of the bolt. Since these IMFs have the same data number at the same time as the circular signal, they may be linearly added in all points of each time.

The IMF linearly added as in the following Equation 1 is referred to as a composite signal, and it is possible to accurately determine a torque through the process of deriving a cepstrum coefficient, determining a reference value, and then determining a Euclidean distance.

$$y_{IMF1}(t_1)+y_{IMF2}(t_1)+y_{IMF2}(t_1)=y_{sum}(t_1)$$ [Equation 1]

The step of predicting an axial force and indicating a predictive value thereof includes a step of transforming the received vibration signal into the frequency domain data (S160), steps of deriving an RPM to form a k value determined according to the torque and the RPM (S171, S173, and S191), and steps of deriving the fastening time to predict and indicate an axial force using the k value and the fastening time (S181, S183, S193, and S195).

Here, the RPM is specified by modulation derived from the vibration signal using frequency transform.

That is, the control frequency component of the fastener is detected by acquiring a signal generated during fastening and performing frequency transform using fast Fourier transform (FFT). The fastening signal includes a control frequency component and an RPM frequency component. When the RPM frequency is relatively low, frequency modulation occurs in the vicinity of the control frequency. Therefore, it is possible to specify an RPM by modulation derived from the vibration (sound) signal using frequency transform.

Here, the frequency modulation means that different frequencies are detected by multiples of a low-frequency signal at both sides of a high-frequency signal when analyzing the frequencies of low- and high-frequency signals.

Furthermore, the fastening time is a difference between a time ($t_1$) at which a predetermined torque is derived and a time ($t_2$) at which the largest signal is generated.

That is, as the fastening proceeds, a load is increased due to a torque so that the amplitude of the vibration (sound) is increased. Thus, the amplitude is largest when the fastening is completed. When $t_1$ is configured as a time at which a predetermined threshold torque is derived and $t_2$ is configured as a time at which the largest signal is generated, the fastening time ($\Delta t$) is $t_2-t_1$.

Accordingly, a parameter k value is determined through the derived torque (T) and the RPM, and an axial force is determined by multiplying the determined parameter k value and the fastening time ($\Delta t$).

Figure 5:
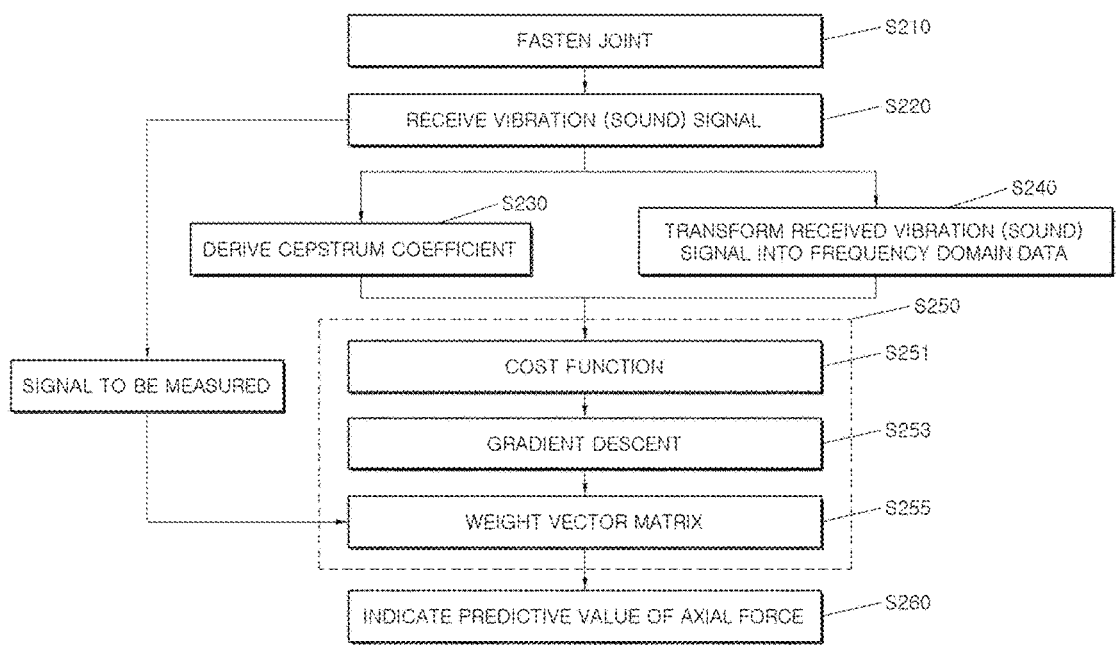
FIG. 5 is a flowchart illustrating a method for measuring an axial force of a bolt according to various exemplary embodiments of the present invention.
Figure 6:
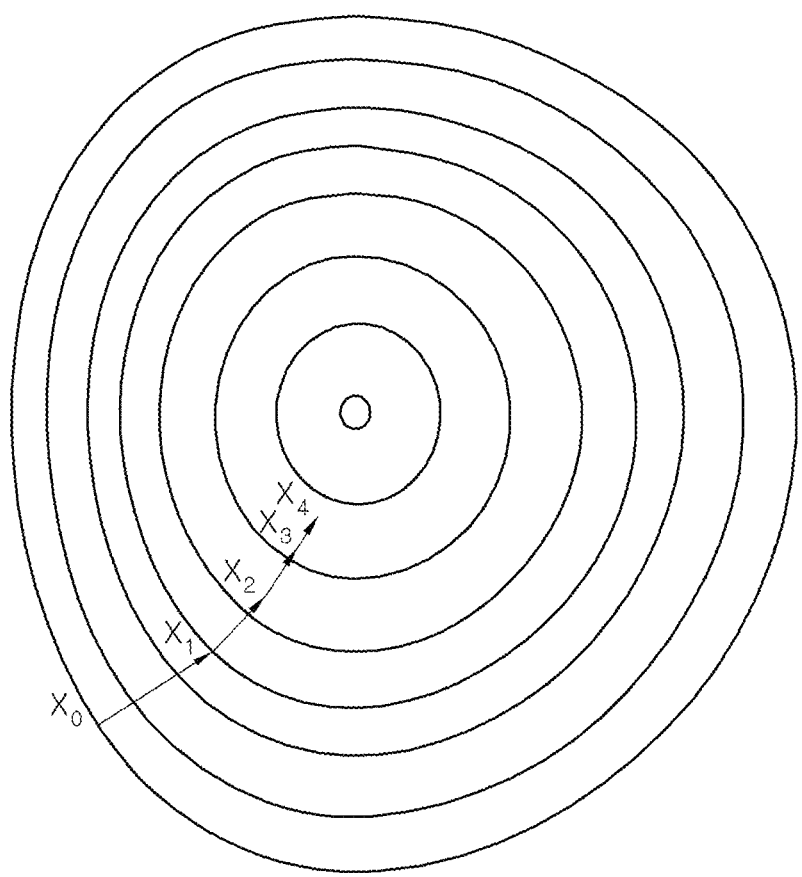
FIG. 6 is a view illustrating a gradient descent method according to an exemplary embodiment of the present invention.

FIG. 5 is a flowchart illustrating a method for measuring an axial force of a bolt according to various exemplary embodiments of the present invention. FIG. 6 is a view illustrating a gradient descent method.

The method for measuring an axial force of a bolt according to the various exemplary embodiments of the present invention corresponds to that according to the first exemplary embodiment of the present invention, and the method for measuring an axial force of a bolt according to the various exemplary embodiments of the present invention will be mainly described regarding points different from the various exemplary embodiments of the present invention.

The method for measuring an axial force of a bolt according to the various exemplary embodiments of the present invention includes fastening a joint using a fastener (S210), receiving a vibration signal by a detector (S220), deriving a cepstrum coefficient (S230), transforming the received vibration signal into frequency domain data having a plurality of frames (S240), a step of determining a weight vector matrix using the cepstrum coefficient, the frequency domain data, and an artificial neural network (S250), and a step of predicting an axial force and indicating a predictive value thereof through a signal to be measured and the learned weight vector matrix (S260).

Here, the weight vector matrix is an array of weights used to derive a signal input to be learned in an artificial neural network theory.

The process of fastening a joint using a fastener (S110) includes rotating a nut about a bolt.

In a process of receiving a vibration signal by a detector (S220), the vibration signal reflecting the fastening force of the bolt is received by the detector 30 including a microphone.

The process of determining a weight vector matrix (S250) includes a step of inputting the cepstrum coefficient and the frequency domain data as a supervised signal which is a vibration signal having a predetermined axial force value as an index, steps of forming a multilayered weight vector matrix by a gradient descent method using a cost function (S251, S253, and S255), and a step of learning and optimizing a plurality of input values.

Here, the supervised signal is a vibration signal having a predetermined axial force value as an index, and the cost function is a function indicative of how much error is in the suitable determination value in the artificial neural network.

The gradient descent method is a series of processes of tracking a value proportional to a negative gradient value at a current point to search a local minimum value, or tracking a direction proportional to the largest positive gradient value at the current point to search a local maximum value.

FIG. 6 is an illustrative example of the gradient descent method, and illustrates that data values are assumed to be a serried function(s) and a local minimum or maximum value is searched using the gradient values of these functions.

Figure 7:
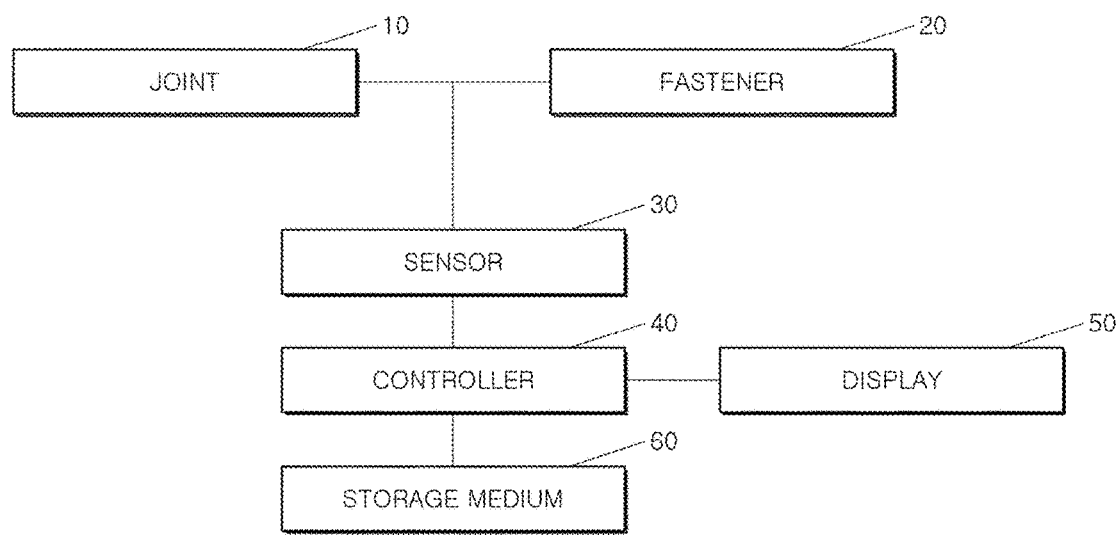
FIG. 7 is a diagram illustrating an apparatus for measuring an axial force of a bolt according to an exemplary embodiment of the present invention.

FIG. 7 is a diagram illustrating an apparatus for measuring an axial force of a bolt according to an exemplary embodiment of the present invention.

Referring to FIG. 7, the apparatus for measuring an axial force of a bolt according to the exemplary embodiment of the present invention includes the joint 10, the fastener 20, the detector 30, the controller 40, the display 50, and a storage medium 60.

The fastener 20 includes a power tool or a hand tool.

The detector 30 receives a vibration signal reflecting the fastening force of a bolt, and a microphone may be used as a signal measurement detector.

The controller 40 is configured to acquire the signal received by the detector 30 and processes and analyzes the signal.

The display 50 indicates an axial force value.

The storage medium 60 stores the method for measuring an axial force of a bolt according to the first to various exemplary embodiments of the present invention.

The present invention is directed to resolve a problem relating to the method for measuring an axial force of a bolt using ultrasonic waves, which is not properly used in the field due to an error generated according to a shape of a bolt head. In accordance with various aspects of the present invention, it is possible to accurately measure the fastening force of the bolt regardless of the shape of the bolt head to be applicable in the actual process of fastening the bolt, and to minimize a preliminary process for measurement.

Furthermore, the present invention can prevent interference since the bolt to be measured has a higher specific frequency band compared to the actual process, and accuracy of measurement can be increased since the axial force of the bolt is directly measured by the method related to the characteristics thereof.

Furthermore, the present invention is advantageous in terms of costs and is applicable to mass production since it requires fewer devices compared to high-priced fastening force measurement equipment used in the related art.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention by defined by the Claims appended hereto and their equivalents.

What is claimed is:

1. A method of measuring an axial force of a fixing member, comprising:
   fastening a joint using a fastener;
   receiving a vibration signal of the fixing member mounted to the joint, by a detector, wherein the vibration signal reflects a fastening force of the fixing member;
   transforming, by a controller, the received vibration signal into frequency domain data having a plurality of frames;
   analyzing, by the controller, the signal transformed into frequency domain data; and
   predicting, by the controller, an axial force of the fixing member and indicating a predictive value of the axial force in a display.

2. The method of claim 1, wherein, in the transforming the received vibration signal into frequency domain data, the received vibration signal undergoes fast Fourier transform while having a predetermined overlap ratio with respect to a predetermined time.

3. The method of claim 2, wherein the predetermined time is 100 ms, and the predetermined overlap ratio is 50% to 90%.

4. The method of claim 1, wherein the analyzing the signal transformed into the frequency domain data includes:
   deriving a cepstrum coefficient;
   determining a reference value; and
   determining a Euclidean distance.

5. The method of claim 4, wherein the deriving the cepstrum coefficient includes:
   applying a high-pass filter to a frequency domain data pair to include only a high-frequency band therein;
   determining a magnitude value a high-frequency section as a representative value for each frame; and
   deriving the cepstrum coefficient by the data pair with a plurality of coefficients.

6. The method of claim 5, wherein, in the determining the magnitude value in the high-frequency section as the representative value, the representative value is determined by dividing a configured frequency bandwidth by multiples of harmonic components.

7. The method of claim 4, wherein, in the determining the reference value, the cepstrum coefficient, which is determined for a signal having a largest fastening force value of the axial three among predetermined vibration signals, is determined as the reference value.

8. The method of claim 4, wherein, in the determining the Euclidean distance, the Euclidean distance between a centroid of a reference value data and a centroid of each fastening force data sample is determined.

9. The method of claim 8, wherein, in the predicting the axial force and indicating the predictive value thereof, Euclidean distance values determined for each fastening force are fitted into a linear or quadratic polynomial function to determine the axial three by a differentiable equation, and the Euclidean distance of the determined vibration signal is substituted into an equation to predict the axial force.

10. A method of measuring an axial force of a fixing member, comprising:
   fastening a joint using a fastener;
   receiving a vibration signal of the fixing member mounted to the joint, by a detector wherein the vibration signal reflects a fastening force of the fixing member;
   determining, by a controller, a torque at a predetermined time by synthesizing vibration signals generated during fastening; and predicting, by the controller, an axial force of the fixing member and indicating a predictive value of the received axial force in a display by transforming the received vibration signal into frequency domain data having a plurality of frames, deriving revolutions per minute (RPM) and a fastening time, and determining the derived RPM and the derived fastening time with the determined torque.

11. The method of claim 10, wherein the determining the torque includes:

selectively synthesizing modes according to the fixing member, characteristics through empirical mode decomposition of the received vibration signal; and determining the torque by deriving a cepstrum coefficient, setting a reference value, and then determining a Euclidean distance.

12. The method of claim 11, wherein the predicting the axial force and indicating the predictive value thereof includes:

transforming the received vibration signal into the frequency domain data;

deriving the RPM to form a k value determined according to the torque and the RPM; and deriving the fastening time to predict and indicate the axial force using the k value and the fastening time.

13. The method of claim 12, wherein the RPM is specified by modulation derived from the vibration signal using frequency transform.

14. The method of claim 12, wherein the fastening time is a difference between a first time ($t_1$) at which a predetermined torque is derived and a second time ($t_2$) at which a largest signal is generated.

15. A method of measuring an axial force of a fixing member, comprising:

fastening a joint using a fastener;

receiving a vibration signal of the fixing member mounted to the joint, by detector wherein the vibration signal reflects a fastening force of the fixing member;

deriving, by a controller, a cepstrum coefficient;

transforming, by the controller, the received vibration signal into frequency domain data having a plurality of frames;

determining, by the controller, a weight vector matrix using the cepstrum coefficient, the frequency domain data, and an artificial neural network; and predicting, by the controller, an axial force of the fixing member and indicating a predictive value of the axial force in a display through a signal to be determined and the determined weight vector matrix.

16. The method of claim 15, wherein the determining the weight vector matrix includes:

inputting the cepstrum coefficient and the frequency domain data as a supervised signal which is a vibration signal having a predetermined axial force value as an index;

forming a multilayered weight vector matrix by a gradient descent method using a cost function; and learning and optimizing a plurality of input values.

* * * * *